Figure 1:
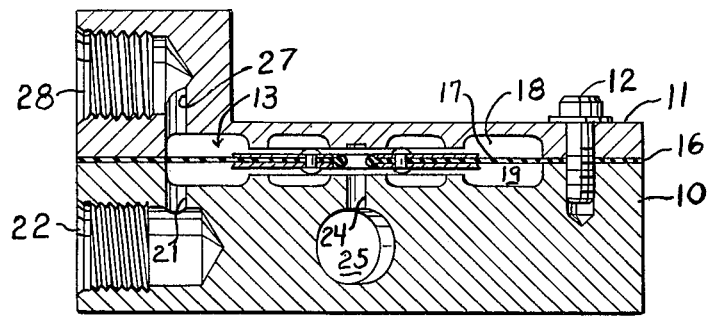

United States Patent [19]
Jones

[11] 3,970,100
[45] July 20, 1976

[54] PRIORITY VALVE

[75] Inventor: Robert L. Jones, Irvine, Calif.

[73] Assignee: Parker-Hannifin Corporation, Cleveland, Ohio

[22] Filed: May 7, 1975

[21] Appl. No.: 576,149

[52] U.S. Cl. ............................................. 137/112
[51] Int. Cl.² ...................... G05D 16/06; F15C 3/04
[58] Field of Search ................... 137/111, 112, 113; 235/201 ME

[56] References Cited
UNITED STATES PATENTS

| | | |
|---|---|---|
| 2,778,373 | 1/1957 | Jaquith ............................ 137/112 |
| 3,008,481 | 11/1961 | Matheson ......................... 137/112 |
| 3,245,426 | 4/1966 | Krueter ............................ 137/112 |
| 3,260,274 | 7/1966 | Morgan ............................ 137/113 |
| 3,779,267 | 12/1973 | Cowan ............................. 137/111 |

Primary Examiner—Robert G. Nilson
Attorney, Agent, or Firm—John N. Wolfram

[57] ABSTRACT

A priority valve that connects either of two inlet ports, whichever has the highest fluid pressure therein, with an outlet port. The valve includes a flexible diaphragm that carries a valve element alternately engageable with a pair of valve seats for controlling the flow of fluid between the inlet ports and the outlet port.

6 Claims, 4 Drawing Figures

U.S. Patent  July 20, 1976  3,970,100

PRIORITY VALVE

BACKGROUND OF THE INVENTION

It is known to provide priority valves having two inlets for fluid under pressure and a single outlet and in which there is a valve element movable by fluid pressure between the two inlet ports for connecting the outlet port with whichever inlet port has the highest pressure therein and for closing off the outlet port from the other inlet port. Such valves usually have a valve element in the form of either a ball, as in U.S. Letters Pat. No. 2,627,388 or a piston, as in U.S. Letters Pat. No. 2,206,957.

In such prior priority valves, the effective area for sensing the differential in pressure between the two inlet ports is equal to the area of the port being closed off and may not provide enough seating force to effectively close the inlet port with the lower pressure.

SUMMARY OF THE INVENTION

The present invention provides a priority valve for connecting either of two inlet ports, whichever has the highest pressure therein, with an outlet port while closing off the other inlet port relative to the outlet port. It employs a valve element carried by a flexible diaphragm whose opposite sides are subjected to fluid pressure of a respective inlet. The valve element has a central opening therethrough that is in axial alignment with the outlet passage and which is movable by the diaphragm into either of two positions. In one position it is spaced from the one seat to permit flow of fluid from one of the inlets past the valve element and into the outlet passage and engages the other seat to block flow of fluid from the other inlet passage to the outlet passage.

In its other position, the valve element is spaced from such other seat to permit flow of fluid from such other inlet to the outlet via an opening through the valve element and engages such one seat to close off flow of fluid from such one inlet passage to the outlet passage.

DETAIL DESCRIPTION

Figure 2:
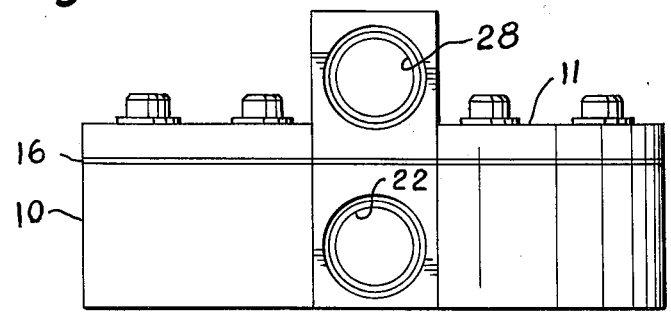
Figure 3:
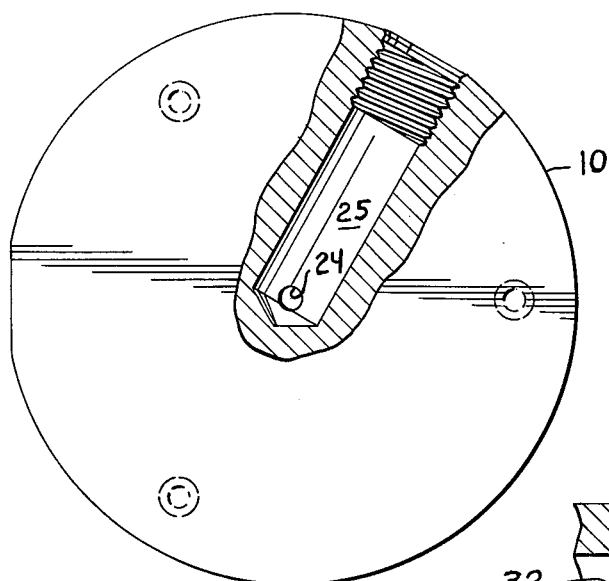
Figure 4:
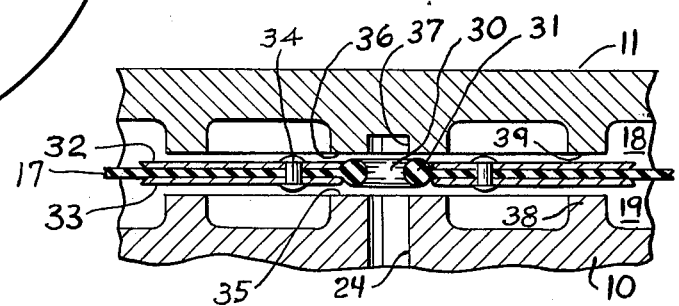

FIG. 1 is a cross section view through the valve.
FIG. 2 is an end view.
FIG. 3 is a bottom view partly in cross section.
FIG. 4 is an enlarged partial cross section view corresponding to FIG. 1.

The valve comprises a body 10 having a cap 11 attached thereto by a series of bolts 12 and forming a valve chamber generally designated 13 therebetween. Clamped between the body and cap at its outer peripheral margin 16 is a flexible diaphragm 17 that divides chamber 13 into a pair of subchambers 18 and 19.

Body 10 has an inlet passage 21 connected at one end to an inlet port 22 and at its other end to subchamber 19. It also has an outlet passage 24 connected to subchamber 19 and to an outlet port 25.

Cap 11 has an inlet passage 27 connected to subchamber 18 and to an inlet port 28.

Diaphragm 17 has a central opening 30 surrounded by a valve element portion 31 of enlarged generally circular cross section and which preferably is integral with diaphragm 17. Diaphragm 17 is preferably of fabric with a coating on each side of elastomeric material but with valve element portion 31 being composed of entirely the elastomeric material. Stiffening plates 32, 33 are fastened to opposite sides of diaphragm 17 by rivets 34 and closely surround valve element portion 31.

Body 10 has an annular valve face 35 surrounding outlet passage 24 and cap 11 has a similar valve face 36 surrounding a short blind bore 37. Valve element 31 initially projects axially beyond plates 32,33 and is alternately engageable with valve faces 35,36. The body and cap have annular raised ribs 38,39 engageable with plates 33,32 for limiting axial movement of diaphragm 17 and consequently limiting the deformation of valve element 31 against valve faces 35,36.

OPERATION

One use for the valve is in an installation where a single supply of fluid is connected to two places of use and the higher of the two fluid pressures at the places of use is used to control or regulate the flow of fluid from the single supply source to the two places of use. A typical applicaton is in an aircraft inerting system wherein the valve senses fluid pressure in two separate fuel tanks and transmits the higher of the two pressures to a single isolation shut off valve that cuts off or limits the flow of inerting fluid from a single source of supply to both fuel tanks when either of the two tank pressures exceeds a predetermined value.

In the disclosed embodiment of the invention, fluid under pressure enters inlet ports 22,28 at either the same or at different times and passes through inlet passages 21,27 into subchambers 18 and 19 where it acts on opposite sides of diaphragm 17. If the pressure in subchamber 19 is greater than in subchamber 18, diaphragm 17 will be forced upwardly so that valve element 31 seats on valve face 36. This seals subchamber 18 from valve opening 30 and outlet passage 24 to prevent flow of fluid therebetween and at the same time raises valve element 31 from valve face 35 to permit flow of fluid from subchamber 19 into outlet passage 24.

When the pressure of fluid in subchamber 18 is greater than that in subchamber 19, diaphragm 17 is forced downwardly to seat valve element 31 against valve face 35 to cut off flow of fluid from subchamber 19 into outlet passage 24 and to open subchamber 18 to valve opening 30 and outlet passage 24.

With the structure as shown, diaphragm 17 is virtually friction free in its movement and presents a large area subject to fluid pressures as compared to the effective area bounded by valve element portion 31. As a result, the valve is very sensitive to small differential of pressures within chambers 18 and 19 for connecting outlet passage 24 to the subchamber of highest pressure and there is negligible hysteresis in the movement of the valve element.

The diaphragm construction provides very low mass of the moving parts so that the valve is relatively insensitive to vibration and there is no possibility of the valve sticking or jamming in one position or the other. Because the diaphragm has large areas subjected to fluid pressure as compared to the area of the valve element, large forces for seating the valve element in one direction or the other are provided with only a small differential in the pounds per square inch of fluid pressure applied to the opposite sides of the diaphragm.

I claim:

1. A priority valve comprising a housing having a valve chamber, first and second valve seats respectively on first and second opposite and parallel walls of said chamber, a flexible diaphragm of elastomeric material extending between said opposite walls and dividing the chamber into first and second subchambers, said diaphragm having an annular central portion of enlarged thickness with seating portions on opposite ends thereof so as to constitute a valve element, said valve element having an opening therethrough immediately adjacent said seating portions that serves as a passage for fluid, a first inlet port for fluid connected to said first subchamber, a second inlet port for fluid connected to second subchamber, an outlet port connected to said first subchamber centrally of one of said valve seats and registering with said opening, said diaphragm being movable by pressure of fluid in said first chamber when said latter pressure is greater than pressure of fluid in the second chamber whereby said valve element engages the second valve seat to seal said opening from said second chamber and is spaced from said first seat to permit flow of fluid from said first subchamber to said outlet port, and said diaphragm being movable by pressure of fluid in said second chamber when the latter pressure is greater than the pressure of fluid in the first chamber whereby said valve element engages said first seat to close communication between the first subchamber and said outlet port and whereby said valve element is spaced from said second seat to permit flow of fluid from said second chamber to said outlet port via said opening.

2. The valve of claim 1 in which said diaphragm includes stiffening means surrounding and adjacent to the valve element, means for attaching the stiffening means to each other with the diaphragm therebetween, and said attaching means being located only radially outwardly of said valve element.

3. The valve of claim 1 in which the valve element has a generally circular cross section whereby said seating portions and the wall of said opening are on a continuous curve when viewed in cross section to provide a smooth flow path for fluid.

4. A priority valve comprising a housing having a valve chamber, first and second valve seats respectively on first and second opposite walls of said chamber, a flexible diaphragm extending between said opposite walls and dividing the chamber into first and second subchambers, an annular valve element carried by the diaphragm and having an opening therethrough, a first inlet port for fluid connected to said first subchamber, a second inlet port for fluid connected to the second subchamber, an outlet port connected to said first subchamber centrally of one of said valve seats and registering with said opening, said diaphragm being movable by pressure of fluid in said first chamber when said latter pressure is greater than pressure of fluid in the second chamber whereby said valve element engages the second valve seat to seal said opening from said second chamber and is spaced from said first seat to permit flow of fluid from said first subchamber to said outlet port, said diaphragm being movable by pressure of fluid in said second chamber when the latter pressure is greater than the pressure of fluid in the first chamber whereby said valve element engages said first seat to close communication between the first subchamber and said outlet port and whereby said valve element is spaced from said second seat to permit flow of fluid from said second chamber to said outlet port via said opening, said diaphragm including stiffening means adjacent the valve element and said valve element is deformable by contact with said seats, said walls include abutment faces, each face being engageable with the stiffening means to limit such deformation of the valve element by the respective seat.

5. A priority valve comprising a housing having a valve chamber, first and second annular valve seats respectively on first and second opposite and parallel walls of said chamber, a flexible diaphragm dividing the chamber into first and second subchambers and having a central opening therethrough surrounded by immediately adjacent annular seat contacting portions of said diaphragm, a first inlet port for fluid connected to the first subchamber, a second inlet port connected to the second subchamber, an outlet passage connected to said valve chamber, said diaphragm being movable by differential of fluid pressures in said subchambers into and out of contact with said seats alternately for controlling flow of fluid from said subchambers to said outlet passage according to which subchamber has the higher fluid pressure therein, said walls having abutment faces radially outwardly of said seats, stiffening members carried by said diaphragm only radially outwardly of said seat contacting portions, said stiffening members being engageable by said abutment faces to limit movement of the diaphragm toward said seats.

6. The valve of claim 5 in which there are fastening means attaching the stiffening members to the diaphragm, said fastening means having portions projecting axially outwardly of the stiffening members, and said housing having recess means between said seats and abutment faces for receiving said fastening means with a clearance therebetween.

\* \* \* \* \*